United States Patent
Curioni et al.

(10) Patent No.: US 9,971,736 B2
(45) Date of Patent: May 15, 2018

(54) METHOD FOR PERFORMING SPARSE MATRIX-MATRIX MULTIPLICATION

(71) Applicant: International Business Machines Corporation, Armonk, NY (US)

(72) Inventors: Alessandro Curioni, Gattikon (CH); Teodoro Laino, Zurich (CH); Valery Weber, Gattikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 14/945,643

(22) Filed: Nov. 19, 2015

(65) Prior Publication Data
US 2017/0147530 A1  May 25, 2017

(51) Int. Cl.
*G06F 17/16* (2006.01)
(52) U.S. Cl.
CPC .................. *G06F 17/16* (2013.01)
(58) Field of Classification Search
CPC ..................................... G06F 17/16
USPC ....................... 708/514, 520, 607
See application file for complete search history.

(56) References Cited

U.S. PATENT DOCUMENTS

| | | | |
|---|---|---|---|
| 8,751,556 B2 * | 6/2014 | Song | G06F 17/10 708/607 |
| 9,558,156 B1 * | 1/2017 | Bekas | G06F 17/16 |

OTHER PUBLICATIONS

V. Weber, T. Laino, A. Pozdneev, I. Fedulova, and A. Curioni, "Semiempirical molecular dynamics (SEMD) I: Midpoint-based parallel sparse matrix-matrix multiplication algorithm for matrices with decay", J. Chem. Theory Comput., vol. 11, No. 7, pp. 3145-3152, 2015.*

A. Pozdneev, V. Weber, T. Laino, C. Bekas and A. Curioni, "Enhanced MPSM3 for Applications to Quantum Biological Simulations," SC16: International Conference for High Performance Computing, Networking, Storage and Analysis, pp. 96-106, 2016.*

K. Bowers, R. Dror, and D. Shaw, "The midpoint method for parallelization of particle simulations," J. Chem. Phys., vol. 124, No. 18, 2006.*

(Continued)

*Primary Examiner* — Matthew Sandifer
(74) *Attorney, Agent, or Firm* — Cantor Colburn LLP; Daniel Morris

(57) ABSTRACT

Embodiments include performing sparse matrix-matrix multiplication. Aspects include receiving a first matrix and a second matrix, providing a pseudo-space for the first and second matrices, and defining pseudo-space segments and assigning the pseudo-space segments to certain processes. Aspects also include assigning matrix elements of the first and second matrix to pseudo-space segments using a midpoint method thereby assigning the matrix elements to processes associated with the pseudo-space segments, assigning a result matrix element of a result matrix to a pseudo-space segment using a midpoint method thereby assigning the result matrix element to a further process associated with the pseudo-space segment and transmitting matrix elements of the first and second matrix required to establish a result matrix element to the further process which processes the result matrix element. Aspects further include performing a multiplication procedure by the further process based on the received matrix elements of the first and second matrix.

20 Claims, 13 Drawing Sheets

(56) References Cited

OTHER PUBLICATIONS

Buluc and J. Gilbert, "Challenges and advances in parallel sparse matrix-matrix multiplication", ICPP, pp. 503-510, 2008.*
E. H. Rubensson, et al., "Locality-Aware Parallel Block-Sparse Matrix-Matrix Multiplication Using the Chunks and Tasks Programming Model", arXiv, Manuscript submitted to SIAM Journal of Scientif Computing (SISC),vol. 2, Mar. 6, 2015, pp. 1-19.
G. Ballard, et al.,"Communication Optimal Parallel Multiplication of Sparse Random Matrices", SPAA 13 Proceedings of the twenty-fifth annual ACM Symposium on Parallelism in Algorithms and Architectures, 2013, p. 1-10.

* cited by examiner

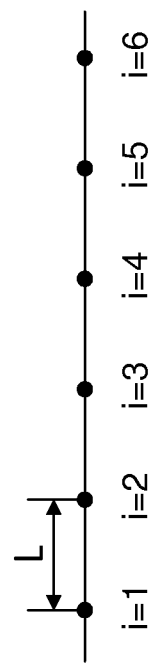
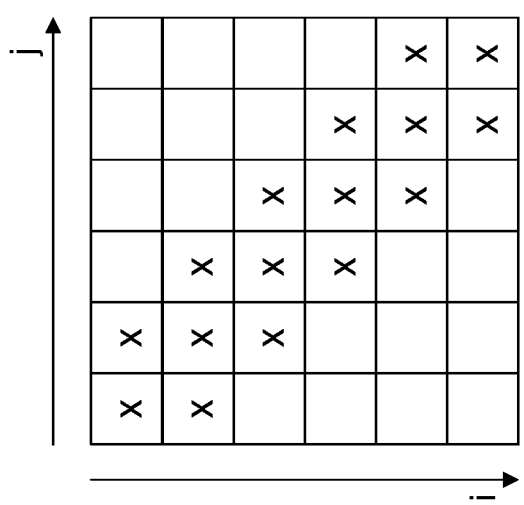
FIG. 3

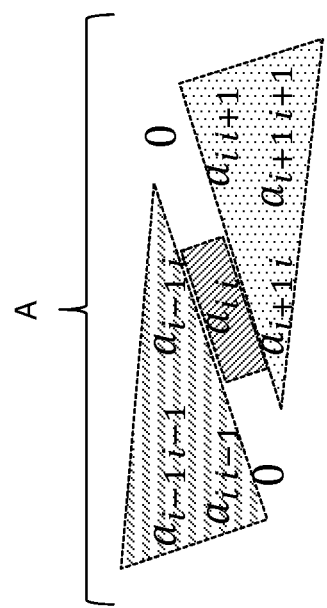
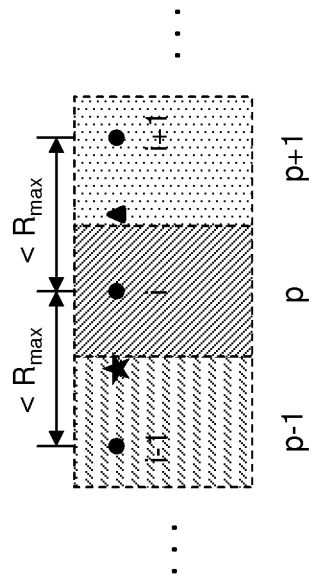
FIG. 6

METHOD FOR PERFORMING SPARSE MATRIX-MATRIX MULTIPLICATION

BACKGROUND

The present invention relates to a method for performing matrix multiplication and more specifically, to a method for performing large-scale sparse matrix-matrix multiplication based on a midpoint approach.

Sparse matrix multiplication is one of the common problems in linear algebra, with important application to recent fields like data analytics. In fact, it comes up often in machine learning, graph analytics and data mining. For instance, graph processing has become an important component of bioinformatics, social network analysis, traffic engineering, etc. With graphs getting larger and queries getting more complex, there is a need for graph analysis frameworks to help users extract the information they need with minimal computational effort. Therefore, improving the speed and scalability of sparse matrix-matrix multiplication algorithm for large matrices is of paramount importance for industries and for the scientific community.

Nowadays, the multiplication of sparse matrices is processed using algorithms designed for dense matrices. The leading methodology to multiply dense matrices is the Shared and Remote memory access based Universal Matrix Multiplication Algorithm (SRUMMA). The main drawback of the SRUMMA algorithm for sparse matrices is the $O(\sqrt{P})$ communication steps as well as the $O(\sqrt{P})$ logistic, wherein P is the number of processes handling the multiplication, i.e. inter-process communication does not decrease linearly or essentially linearly with increasing number of processes. This parallel behavior prevents the processing of large-scale sparse matrices, irrespective of the available computational power. Although a large number of efforts were made in the last years, no algorithm for sparse matrices goes beyond the $(\sqrt{P})$ scalability limit.

SUMMARY

In one aspect, a computer-implemented method for performing sparse matrix-matrix multiplication is provided. The method includes receiving a first matrix and a second matrix, the matrices being matrices with decay, providing a pseudo-space for the first and second matrices, the pseudo-space comprising pseudo particles indicative for mapping matrix elements of the first and second matrix into the pseudo-space, and defining pseudo-space segments and assigning the pseudo-space segments to certain processes. The method also includes assigning matrix elements of the first and second matrix to pseudo-space segments using a midpoint method thereby assigning the matrix elements to processes associated with the pseudo-space segments and assigning a result matrix element of a result matrix to a pseudo-space segment using a midpoint method thereby assigning the result matrix element to a further process associated with the pseudo-space segment. The method further includes transmitting matrix elements of the first and second matrix required to establish a result matrix element to the further process which processes the result matrix element and performing a multiplication procedure by the further process based on the received matrix elements of the first and second matrix.

According to a further aspect, a computer program product for performing sparse matrix-matrix multiplication is provided. The computer program product comprises a computer readable storage medium having program instructions embodied therewith, the program instructions executable by a processor to cause the processor to execute the method includes receiving a first matrix and a second matrix, the matrices being matrices with decay, providing a pseudo-space for the first and second matrices, the pseudo-space comprising pseudo particles indicative for mapping matrix elements of the first and second matrix into the pseudo-space, and defining pseudo-space segments and assigning the pseudo-space segments to certain processes. The method also includes assigning matrix elements of the first and second matrix to pseudo-space segments using a midpoint method thereby assigning the matrix elements to processes associated with the pseudo-space segments and assigning a result matrix element of a result matrix to a pseudo-space segment using a midpoint method thereby assigning the result matrix element to a further process associated with the pseudo-space segment. The method further includes transmitting matrix elements of the first and second matrix required to establish a result matrix element to the further process which processes the result matrix element and performing a multiplication procedure by the further process based on the received matrix elements of the first and second matrix.

According to yet a further aspect, a system for performing sparse matrix-matrix multiplication is provided. The system includes an interface for receiving a first matrix and a second matrix, the matrices being decay matrices, and a data processing entity comprising multiple processors, the data processing entity being adapted to perform a method. The method includes receiving a first matrix and a second matrix, the matrices being matrices with decay, providing a pseudo-space for the first and second matrices, the pseudo-space comprising pseudo particles indicative for mapping matrix elements of the first and second matrix into the pseudo-space, and defining pseudo-space segments and assigning the pseudo-space segments to certain processes. The method also includes assigning matrix elements of the first and second matrix to pseudo-space segments using a midpoint method thereby assigning the matrix elements to processes associated with the pseudo-space segments and assigning a result matrix element of a result matrix to a pseudo-space segment using a midpoint method thereby assigning the result matrix element to a further process associated with the pseudo-space segment. The method further includes transmitting matrix elements of the first and second matrix required to establish a result matrix element to the further process which processes the result matrix element and performing a multiplication procedure by the further process based on the received matrix elements of the first and second matrix.

BRIEF DESCRIPTION OF THE DRAWINGS

In the following embodiments of the invention are explained in greater detail, by way of example only, making reference to the drawings in which:

FIG. 3 illustrates an example schematic 6×6-matrix (left side) and the corresponding pseudo space (right side);

FIG. 6 illustrates the assignment of matrix elements of a matrix (left side) to pseudo-space segments (right side);

DETAILED DESCRIPTION

Figure 1:
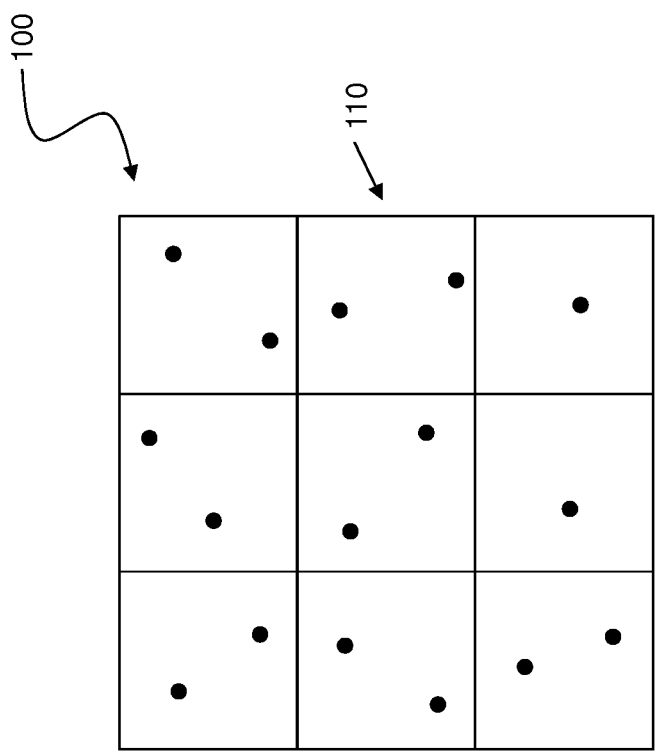
FIG. 1 illustrates an example embodiment of a pseudo space including multiple pseudo particles (dots)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Fortran or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates an example pseudo space 100. The shown pseudo space 100 may correspond to a decay matrix or sparse matrix where the vast majority of matrix element values are zero. Such matrixes with decay are for example disclosed in J. W. Demmel and N. J. Higham, ACM TRANS. MATH. SOFTW. 18, 274/1992. The pseudo space may comprise a certain dimension (1D, 2D, 3D, . . . , nD) depending on the dimensionality of the problem underlying the respective matrix. Said pseudo space may comprise multiple pseudo particles. The number of pseudo particles and their position relative to each other may be achieved based on a fit procedure (e.g. spatial decomposition method) by investigating the matrix elements of a given matrix, the position of non-zero-matrix elements, respectively, zero matrix elements and the values of the non-zero-matrix elements.

Decay matrices may show an exponential or essentially exponential decay of matrix element values. For example, the absolute values of matrix elements of a decay matrix may be characterized by the following in equation:

$$|A_{ij}| < const \cdot e^{\frac{r_{ij}^d}{R_{max}}}$$

wherein:
$|A_{ij}|$ is the absolute value of a matrix element $A_{ij}$;
$r_{ij}$ is the distance between pseudo particles i, j;
d is the dimensionality of the problem; and
$R_{max}$ is the characteristic radius of matrix A In other words, the distance between two pseudo particles ($r_{ij}$) depends on the absolute values of the matrix elements being correlated with said pseudo particles. The characteristic radius $R_{max}$ of a certain matrix A indicates that matrix elements corresponding to locations which have a distance to a certain point (representing the result matrix element of a result matrix achieved by sparse matrix multiplication) greater than $R_{max}$ do in no way contribute to the multiplication process of said result matrix element. So, in other words, the pseudo space is indicative for the interaction of matrix elements in the matrix multiplication process.

Figure 2:
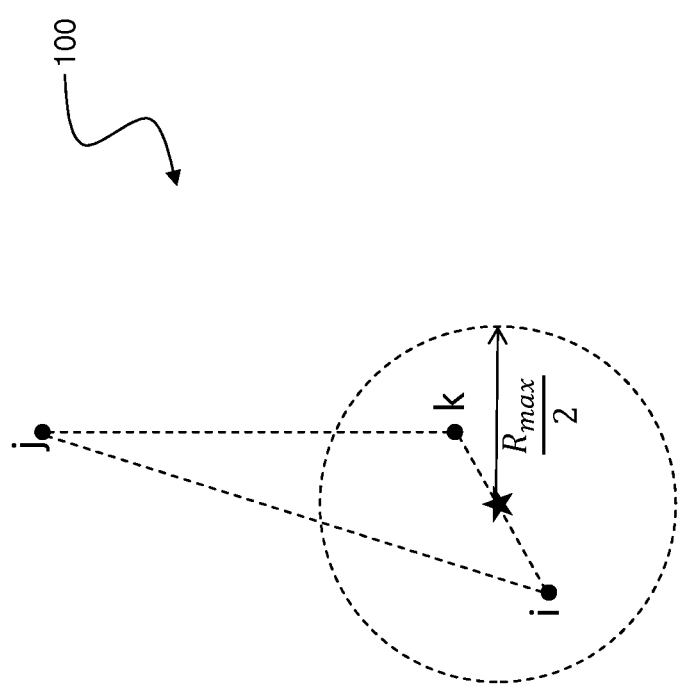
FIG. 2 illustrates an example section of a pseudo space including pseudo particles with a corresponding characteristic length.

FIG. 2 shows a two-dimensional pseudo space 100 comprising pseudo elements i, j and k. It is worth mentioning that the pseudo space 100 may be segmented in pseudo-space segments 110, as shown in FIG. 1 by means of the grid. Said pseudo-space segments 110 may be associated with a certain process which is hosted by a certain processor. According to embodiments, each processor may only handle a single process and therefore cover a single pseudo-space segment 110. According to other embodiments, one processor may handle multiple processes and may therefore be associated with multiple pseudo-space segments 110. As described before, the locations within a pseudo-space segment 110 may correspond to certain matrix elements of a matrix. The processor covering said pseudo-space segment 110 may comprise storage means (e.g. the cache of a processor) for storing the matrix elements associated with the respective pseudo-space segment 110.

Based on the pseudo particles i, j, k it is possible to determine the process which stores a certain matrix element. Considering the matrix element $a_{ik}$ of matrix A, the midpoint between pseudo particles i and K corresponds to the matrix element $a_{ik}$ (asterisk in FIG. 2). Assuming that the midpoint belongs to a pseudo-space segment 110 covered by process P1, the processor handling process P1 stores said matrix element $a_{ik}$. In general, a midpoint approach is used for distributing the matrix elements to processes/processors, respectively, determining which process/processor covers a certain matrix element $a_{ik}$.

In order to calculate a sparse matrix-matrix product, a plurality of matrix elements are involved. Based on the pseudo space, matrix elements can be determined which have an influence on a result matrix element obtained by a matrix-matrix multiplication. Assuming that the asterisk in FIG. 2 is associated with a certain result matrix element $c_{ij}$, the dashed circle having a radius $0.5*R_{max}$ defines an upper bound for matrix elements (associated with locations of the pseudo space within the dashed circle) taking influence on the result matrix element $c_{ij}$. Thereby, a significant reduction of processing effort in sparse matrix-matrix multiplication could be obtained.

FIGS. 3 to 8 show an example for illustrating the steps of sparse matrix-matrix multiplication according to the proposed method. FIG. 3 shows on the left side an example 6×6 tridiagonal matrix. The diagonally arranged matrix elements from the top left to the bottom right are filled by certain values X wherein X is a constant value. More in detail, the principal diagonal line (top left-bottom right) and its neighboring lines are filled with values X wherein the other matrix elements (upper right corner, bottom left corner) are zero.

Figure 4:
FIG. 4 illustrates an example section of a matrix (left side) and the mapping of said matrix elements to a corresponding pseudo space (right side)

The right diagram of FIG. 3 shows the pseudo space corresponding to said example 6×6 tridiagonal matrix. The 6×6 tridiagonal matrix is transformed in a 1D-pseudo space comprising six equally distanced pseudo particles i. The distance between said pseudo particles is L. In the present embodiment, an upper bound for the characteristic length $R_{max}$ can be defined by the following in equation:

$$L \leq R_{max} \leq 2L$$

because, due to the tridiagonal architecture of the matrix, a certain matrix element $a_{ij}$ can only interact with matrix elements $a_{i-1j}$, $a_{ij-1}$, $a_{i+1j}$, $a_{ij+1}$, $a_{i-ij-1}$ and $a_{i+1j+1}$. FIG. 4 shows a 3×3 matrix segment of the matrix of FIG. 3 and the corresponding pseudo space including the pseudo particles i−1, i and i+1.

Figure 5:
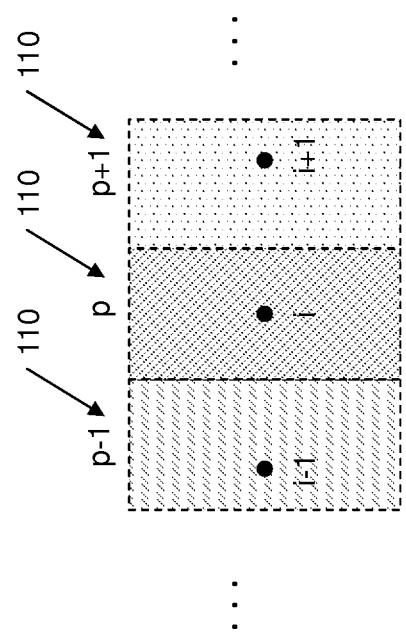
FIG. 5 illustrates an example segmentation of the pseudo space and an example process assignment.

FIG. 5 shows the segmentation of the pseudo space based on the number of available processes handling the matrix-matrix multiplication. The whole pseudo space is divided in a number of pseudo-space segments 110. Each pseudo-space segment 110 is correlated with a certain process p−1, p, p+1. The pseudo-space segments 110 associated with a certain process are marked by a certain background shading. Based on the pseudo-space segments 110, the pseudo particles i−1, i and i+1 as well as intermediate points between said pseudo particles are covered by the process which is associated with the respective pseudo-space segment 110.

After segmenting the pseudo space and assigning processes to the pseudo-space segments 110, matrix elements can be associated to certain processes, as illustrated in FIG. 6. The respective background shading of the matrix portions illustrates which matrix elements are stored in a processor hosting the respective process p−1, p, p+1. So, for example, the matrix element $a_{i-1\ i-1}$ is associated with the pseudo particle i−1 which is included in the short-line dashed left pseudo-space segment and therefore hosted by process p−1. Similarly, matrix element $a_{ii}$ is associated with the pseudo particle i which is included in the dashed middle pseudo-space segment and therefore hosted by process p; and matrix element $a_{i+1\ i+1}$ is associated with the pseudo particle i+1 which is included in the dotted right pseudo-space segment and therefore stored by process p+1. Using upper-mentioned midpoint analysis, also matrix elements $a_{i\ i-1}, a_{i-1\ i}, a_{i\ i+1}$ can be associated with certain processes. For example, the asterisk indicates a point being associated with the matrix elements $a_{i\ i-1}, a_{i-1\ i}$. Said asterisk is located at the midpoint between pseudo particles i−1 and i. Similarly, the triangle indicates a point being associated with the matrix elements $a_{i\ i+1}, a_{i+1\ i}$. Said triangle is located at the midpoint between pseudo particles i and i+1. As shown in FIG. 6, the asterisk is located within the left pseudo-space segment (short-line dashed). Thus, the matrix elements $a_{i\ i-1}, a_{i-1\ i}$ are hosted by process p−1. The triangle, however, is located within the right pseudo-space segment (dotted pseudo-space segment). Therefore, the matrix elements $a_{i\ i+1}, a_{i+1\ i}$ are hosted by process p+1.

Figure 7:
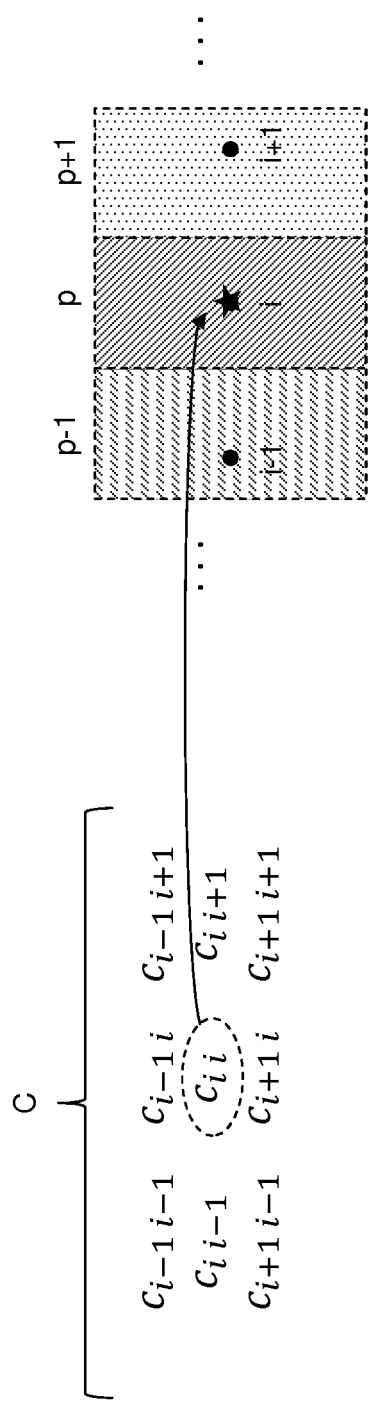
FIG. 7 illustrates an example section of a result matrix (left side) and the mapping of a result matrix element to a corresponding pseudo space (right side)

FIG. 7 shows the assignment of a result matrix segment C to the pseudo space 100. The assignment of result matrix elements of the result matrix C to pseudo-space positions, respectively, pseudo-space segments can be obtained analogously to the assignment shown in FIG. 6. So, for example, the result matrix elements $c_{i+1\ i-1}, c_{i\ i}$ and $c_{i-1\ i+1}$ are associated with the middle pseudo-space segment (dashed pseudo-space segment) whereas the result matrix elements $c_{i-1\ i-1}, c_{i-1\ i}$ and $c_{i\ i-1}$ are associated with the left pseudo-space segment (short-dashed pseudo-space segment) and the result matrix elements $c_{i\ i+1}, c_{i+1\ i}$ and $c_{i+1\ i+1}$ are associated with the right pseudo-space segment (dotted pseudo-space segment). Thereby, for example, it is possible to determine which process/processor is handling the calculations leading to a certain result matrix element.

Figure 8:
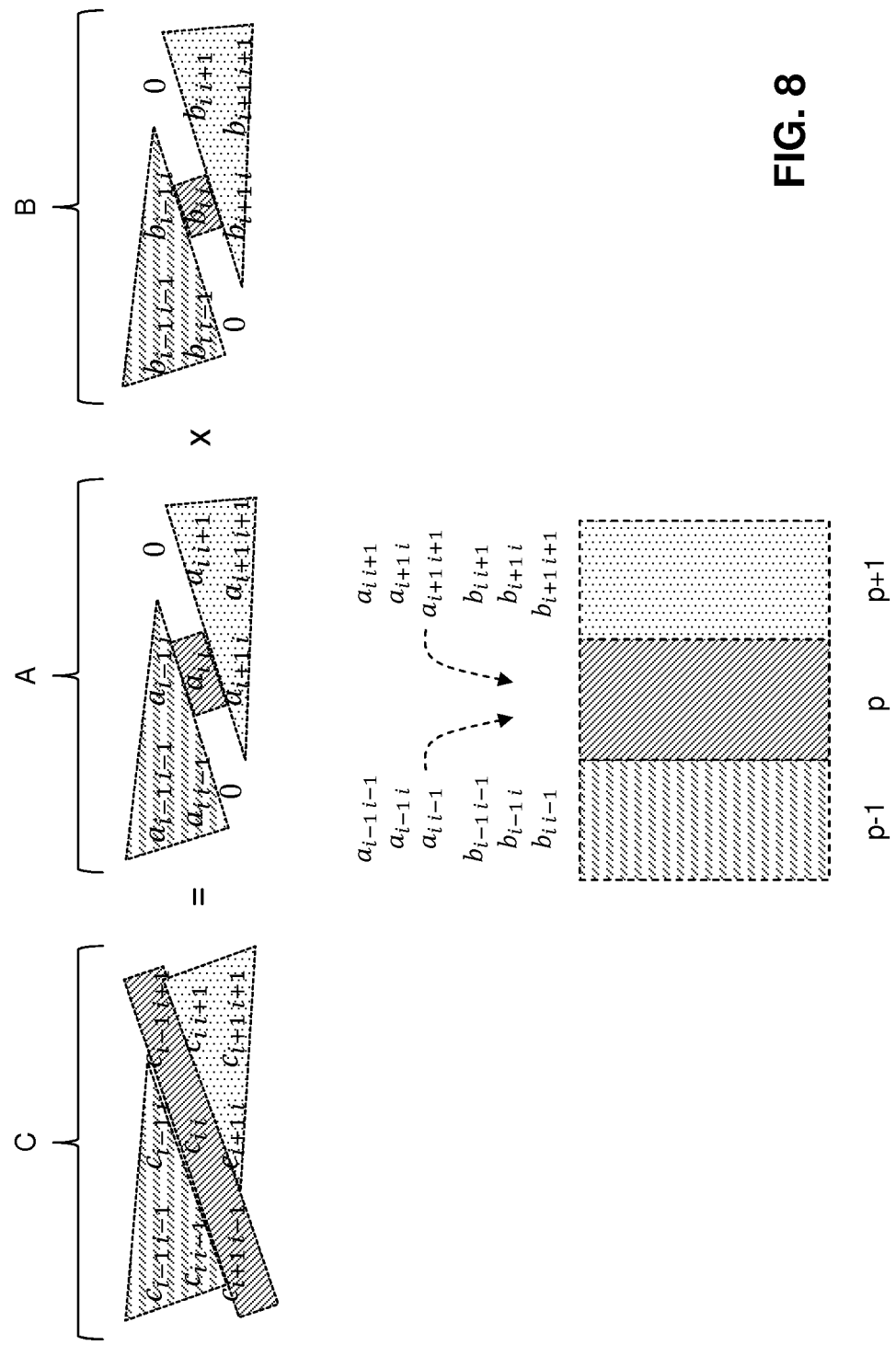
FIG. 8 illustrates the inter-process transmission required for calculating the matrix elements.

In order to be able to calculate a certain result matrix element (e.g. the result matrix element $c_{i-1\ i+1}$), certain matrix elements have to be available for the process/processor is handling the calculations of said result matrix element. FIG. 8 shows the multiplication of two sparse matrices A, B and the transmission of needed matrix elements to the process p. For example, in order to be able to calculate result matrix element $c_{i-1\ i+1}$, the following matrix elements of matrices A and B have to be available at process p (elements of upper row of matrix A and elements of right column of matrix B): $a_{i-1\ i-1}, a_{i-1\ i}, b_{i\ i+1}$ and $b_{i+1\ i+1}$. These matrix elements are transmitted to the process handling the result matrix element $c_{i-1\ i+1}$ (process p) in order to calculate said result matrix element $c_{i-1\ i+1}$.

Figure 9:
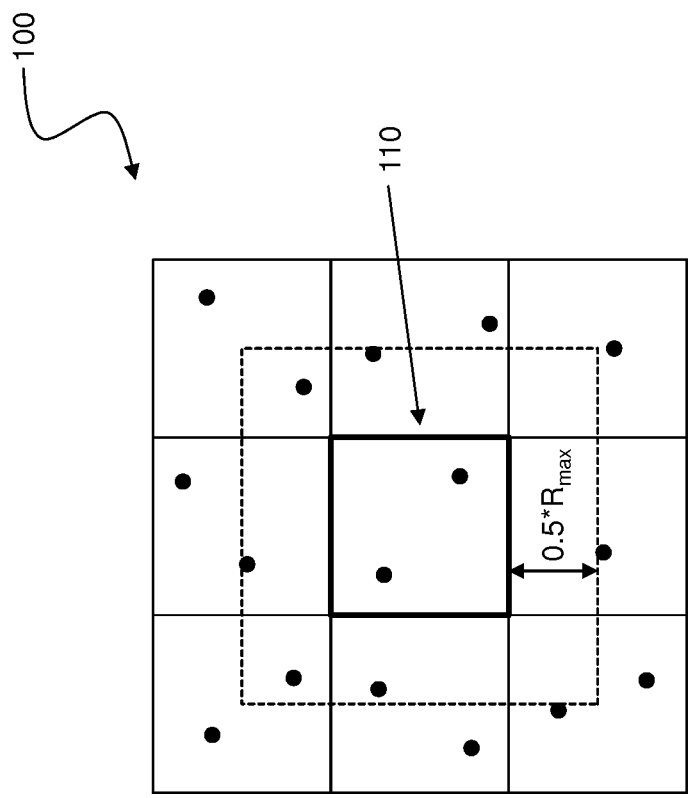
FIG. 9 illustrates a pre-filtering step before transmitting the matrix elements to the handling process.

In order to reduce the number of matrix element transmissions and the multiplication steps having no influence on the result matrix elements (basically multiplication of matrix elements having a value of zero), one or more filtering steps may be performed. For example, a first filtering step may be performed before transmission of matrix elements to a certain process/processor (pre-filtering). Said pre-filtering reduces the number of matrix elements of matrices involved in the sparse matrix-matrix multiplication independently from each other by merely considering the pseudo-space segment 110 handling the multiplication and defining, by means of the characteristic length $R_{max}/2$ which matrix elements could be involved in the processing. FIG. 9 illustrates said pre-filtering step. For example, the process associated with the middle pseudo-space segment 110 (bold line) may handle a multiplication step regarding a certain result matrix element. As such, only matrix elements can contribute to the multiplication result which have a distance to the boundary of said middle pseudo-space segment 110 lower than the characteristic length $R_{max}/2$ (illustrated by the dashed square). So, in other words, matrix elements outside the $R_{max}/2$ boundary do not have to be transmitted and can be filtered out.

Figure 10:
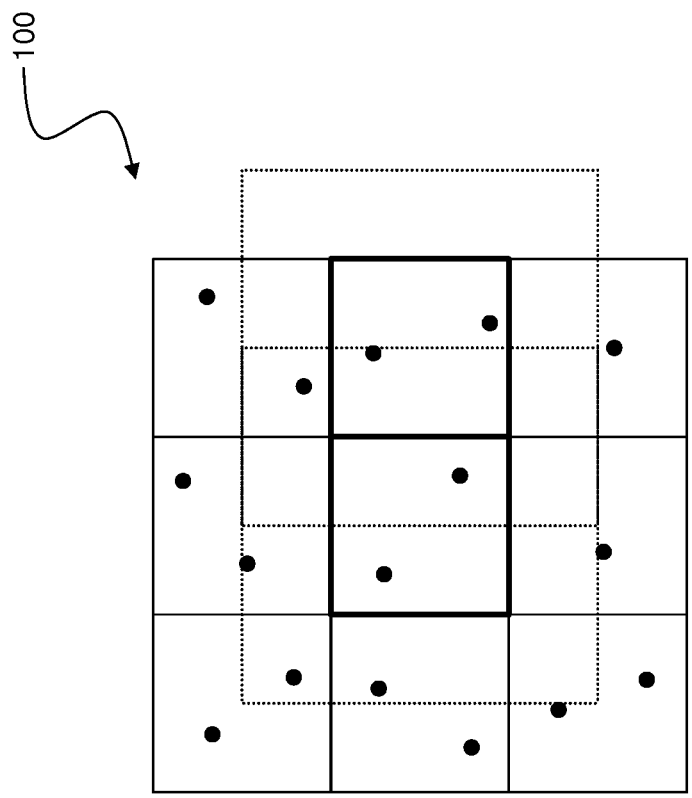
FIG. 10 illustrates a post-filtering step before performing the calculation of a certain result element.

Alternatively or in addition, also a filtering step may be performed after transmitting matrix elements to the process/processor handling the multiplication step (post-filtering). Post-filtering performs a reduction of matrix elements which do not contribute to a certain multiplication step. So, in other words, post-filtering is performed on matrix elements of a pair of matrices prior performing matrix multiplication. As shown in FIG. 10, each matrix involved in matrix multiplication is associated with a certain pseudo-space segment 110 which is surrounded by a respective upper bound domain (illustrated by the dashed squares) obtained by characteristic length $R_{max}/2$. Only those pairs of matrix elements may have a contribution on the multiplication result which lie in intersection area of said upper bound domains. All other matrix elements might be filtered out based on said post-filtering step. Thereby, the processing demand may be further reduced.

Figure 11:
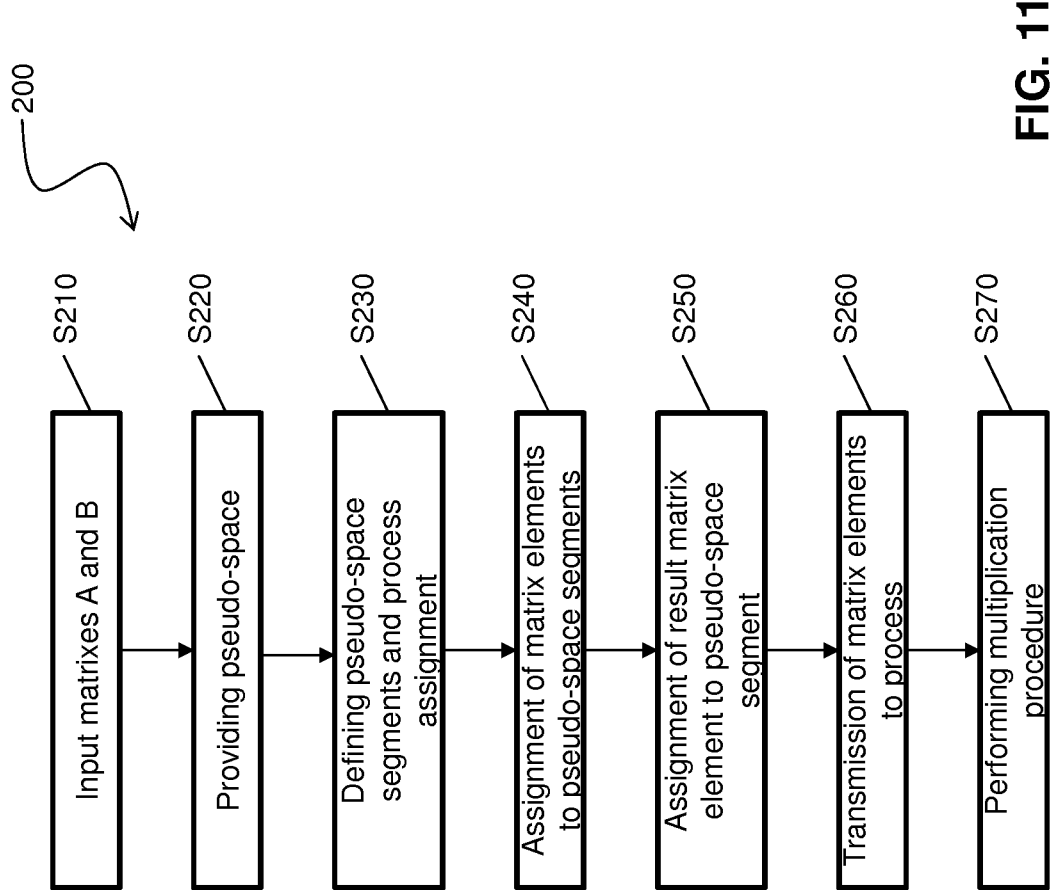
FIG. 11 illustrates the method steps of an example method for sparse matrix-matrix multiplication.

FIG. 11 shows a flow chart illustrating the method steps performed for a sparse matrix-matrix multiplication 200. First, a first matrix A and a second matrix B may be received (S210). For example, said matrices may be received at an interface of a computing system performing said sparse matrix-matrix multiplication. After receiving the matrices, the pseudo space is provided (S220). More in detail, the pseudo space may be created after investigating the matrices and establishing pseudo particles within the pseudo space (e.g. based on a upper bound least square minimum algorithm). Said pseudo space may be segmented based on the number of available processes/processors and processes may be assigned to the respective pseudo-space segments (S230).

After pseudo space segmentation, the matrix elements of the received matrices A and B may be assigned to the pseudo space segments (S240) followed by an assignment of result matrix elements to the pseudo space segments (S250). After matrix element assignment, the matrix elements required for a certain result matrix element calculation are transmitted to the process performing said calculation (S260). Finally, the result matrix element calculation is performed by the respective process, respectively within the respective processor (S270).

Figure 12:
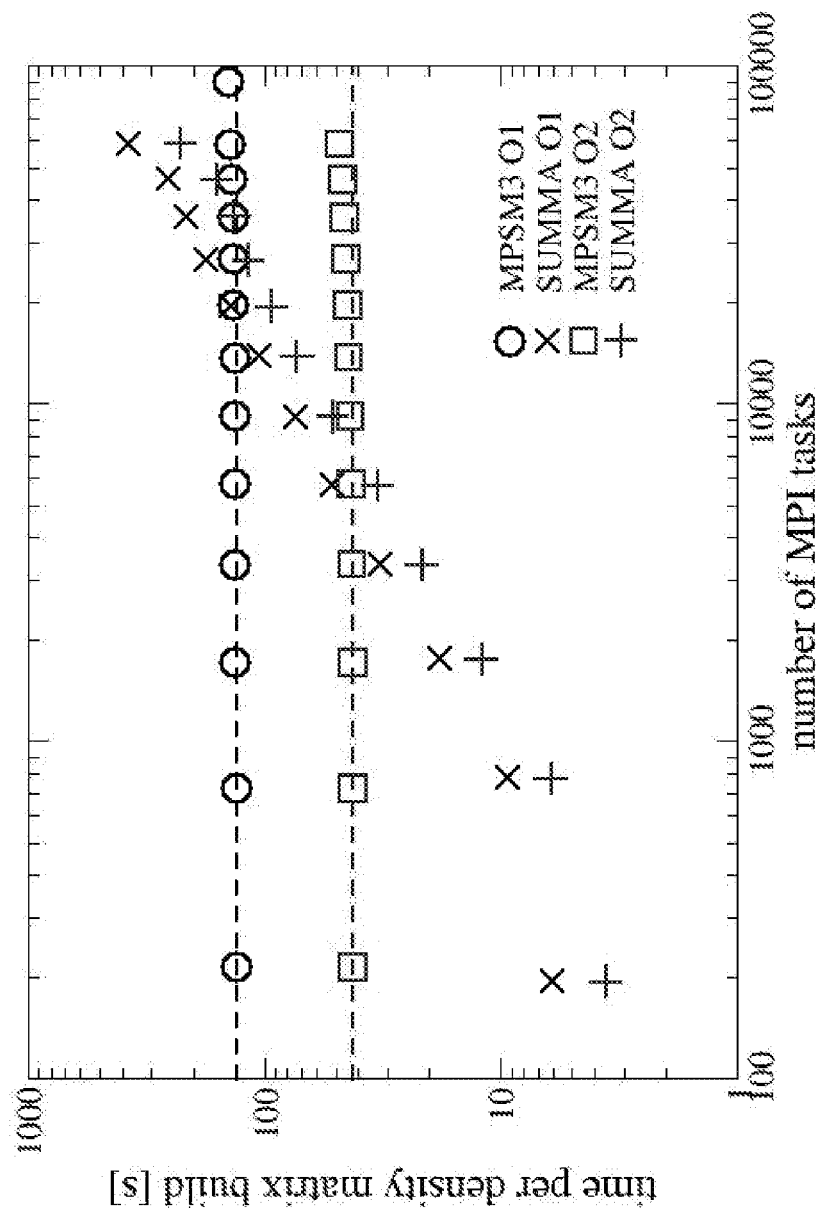
FIG. 12 illustrates example first computation results comparing the disclosed method with known SUMMA method for different sparsity sets named as O1 and O2.

FIG. 12 shows weak scaling results of the proposed midpoint based parallel sparse matrix-matrix multiplication algorithm (MPSM3) vs. scalable universal matrix multiplication algorithm (SUMMA) for matrices showing different sparsity sets (O1, O2). The time per density matrix build as a function of the number of MPI tasks is presented with logarithmic scales for SUMMA and MPSM3, for two different occupations of the matrix, O1 and O2. Because of logistics and unfavourable communications, the SUMMA algorithm should scale, at best, as the square root of the number of MPI tasks whereas MPSM3 essentially shows a constant wall time with rising number of resources. Thereby, nearly a constant time to solution is provided (independent of the problem size), assuming that proportional computational resources are available.

Figure 13:
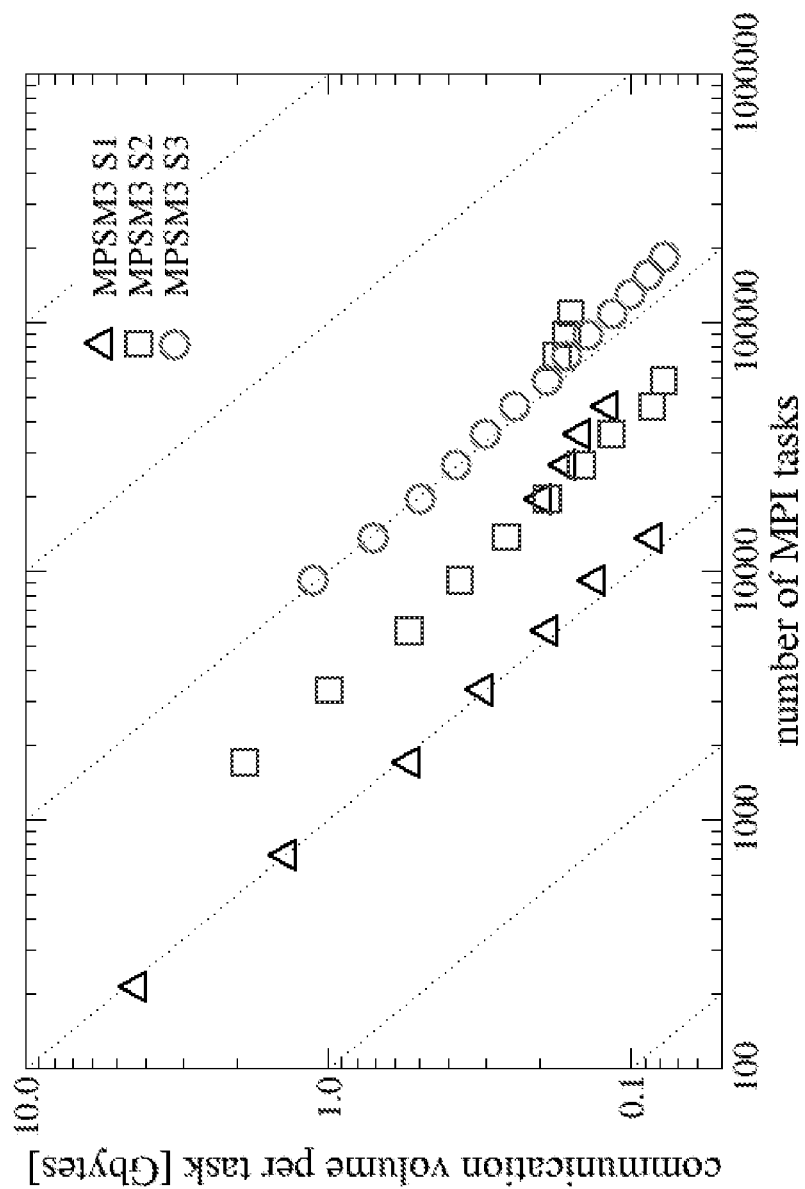
FIG. 13 illustrates example second computation results comparing communication effort of the disclosed method and known SUMMA method for different matrix sizes (named S1, S2 and S3).

FIG. 13 shows the communication volume per task (in Gbytes) vs. number of MPI tasks for MPSM3 having different matrix sizes (S1, S2, S3). So, when rising the computational resources (e.g. number of processors), the inter-process-communication may be close to linearly or essentially linearly reduced.

Summing up, a method and system for performing large-scale sparse matrix-matrix multiplications has been presented. The system and method may improve the usage of memory locality and may lower the inter-process-communications compared to known matrix multiplication algorithms. Thereby, a constant time to solution independent of the problem size (provided that enough computational resources are available) and an essentially linear decrease of communication volume when increasing the number of processors is achieved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for performing sparse matrix-matrix multiplication, the method comprising:
   receiving a first matrix and a second matrix, said matrices being matrices with decay;
   providing a pseudo-space for said first and second matrices, the pseudo-space comprising pseudo particles indicative for mapping matrix elements of the first and second matrix into said pseudo-space;
   defining pseudo-space segments based on a number of available processors and assigning said pseudo-space segments to certain processors of the available processors;
   assigning matrix elements of said first and second matrix to pseudo-space segments using a midpoint method thereby storing the matrix elements in respective caches corresponding to the certain processors associated with said pseudo-space segments;
   assigning a result matrix element of a result matrix to a pseudo-space segment using a midpoint method thereby assigning said result matrix element to a further processor associated with said pseudo-space segment;
   transmitting matrix elements of the first and second matrix required to establish a result matrix element to said further processor which processes said result matrix element; and
   performing a multiplication procedure by said further processor based on the received matrix elements of the first and second matrix.

2. The computer-implemented method of claim 1, wherein defining a pseudo space comprises using an optimization procedure, specifically a constrained optimization procedure which maps the matrix elements of the first and second matrix to one of said pseudo particles or midpoints between said pseudo particles.

3. The computer-implemented method of claim 2, wherein the optimization procedure uses a spatial decomposition method.

4. The computer-implemented method of claim 1, the distance between two pseudo particles or midpoints between said pseudo particles being indicative for the interaction of the matrix elements associated with said pseudo particles or said midpoints between pseudo particles.

5. The computer-implemented method of claim 1, the dimension of the pseudo space depending on the dimension of the problem underlying the first and/or second matrix.

6. The computer-implemented method of claim 1, the step of defining pseudo space segments comprises dividing the pseudo space in a number of segments, said number of segments being equal to the number of processes provided for sparse matrix-matrix multiplication.

7. The computer-implemented method of claim 1, each process provided for sparse matrix-matrix multiplication is handled by a separate processor or at least a portion of said processes being handled by a common processor.

8. The computer-implemented method of claim 1, wherein assigning matrix elements of said first and second matrix to pseudo-space segments is performed by identifying a pair of pseudo particles corresponding to the matrix element, determining the midpoint between said pseudo particles and determining the pseudo-space segment in which said midpoint is located.

9. The computer-implemented method of claim 1, wherein assigning matrix elements of said first and second matrix to pseudo-space segments is limited to those pseudo particle tuples for which the following inequation is fulfilled:

$$L \leq R_{max};$$

wherein: L is the distance between the pseudo particle tuple; and
$R_{max}$ is the characteristic radius.

10. The computer-implemented method of claim 1, wherein assigning a result matrix element of a result matrix to a pseudo-space segment is performed by identifying a pair of pseudo particles corresponding to the result matrix element, determining the midpoint between said pseudo particles and determining the pseudo-space segment in which said midpoint is located.

11. The computer-implemented method of claim 1, wherein at least one filtering step is performed in order to reduce the amount of data to be transmitted between different processes and/or to reduce the number of multiplication steps which do not contribute to the result matrix.

12. The computer-implemented method of claim 1, performing a pre-filtering step which reduces the number of matrix elements involved in a certain multiplication step by considering the interaction of the matrix elements of the first or second matrix with respect to the result matrix elements.

13. The computer-implemented method of claim 1, performing a pre-filtering step which suppresses transmission of matrix elements to the further process which have a distance to the boundaries of the pseudo space segment associated with said further process greater than the characteristic radius $R_{max}/2$.

14. The computer-implemented method of claim 1, wherein, after transmission of the matrix elements to the further process, a post-filtering is performed, said post filtering considering the spatial distribution of midpoints representing matrix elements of the first and second matrix involved in the calculation of a certain result matrix element.

15. The computer-implemented method of claim 1, wherein, after transmission of the matrix elements to the further process, a post-filtering is performed, said post filtering suppressing the usage of those matrix elements of the first and second matrix for calculating a certain result matrix element, which are associated with midpoints that have a distance in the pseudo space to the respective mid point representing the result matrix element greater than the characteristic radius $R_{max}/2$.

16. The computer-implemented method of claim 1, the first and second matrices being matrices with exponential or approximately exponential decay.

17. The computer-implemented method of claim 1, the values of the matrix elements of the first and second matrix being characterized by the in equation:

$$|A_{ij}| < const \cdot e^{\frac{r_{ij}^d}{R_{max}}}$$

wherein: $|A_{ij}|$ is the absolute value of a matrix element $A_{ij}$;
$r_{ij}$ is the distance between pseudo particles i, j;
d is the dimensionality of the problem; and
$R_{max}$ is the characteristic radius of matrix A.

18. The computer-implemented method of claim 17, wherein $r_{ij}$, d and $R_{max}$ form upper bound values and are calculated by investigating all entries of the respective matrix A.

19. A computer program product for performing sparse matrix-matrix multiplication, the computer program product comprising a computer readable storage medium having program instructions embodied therewith, the program instructions executable by a processor to cause the processor to execute the method comprising:
receiving a first matrix and a second matrix, said matrices being matrices with decay;
providing a pseudo-space for said first and second matrices, the pseudo-space comprising pseudo particles indicative for mapping matrix elements of the first and second matrix into said pseudo-space;
defining pseudo-space segments based on a number of available processors and assigning said pseudo-space segments to certain processors of the available processors;
assigning matrix elements of said first and second matrix to pseudo-space segments using a midpoint method thereby storing the matrix elements in respective caches corresponding to the certain processors associated with said pseudo-space segments;
assigning a result matrix element of a result matrix to a pseudo-space segment using a midpoint method thereby assigning said result matrix element to a further processor associated with said pseudo-space segment;
transmitting matrix elements of the first and second matrix required to establish a result matrix element to said further processor which processes said result matrix element; and
performing a multiplication procedure by said further processor based on the received matrix elements of the first and second matrix.

20. A system for performing sparse matrix-matrix multiplication, the system comprising:
an interface for receiving a first matrix and a second matrix, said matrices being matrices with decay;
a data processing entity comprising multiple processors, the data processing entity being adapted to:
provide a pseudo-space for said first and second matrices, the pseudo-space comprising pseudo particles indicative for mapping matrix elements of the first and second matrix into said pseudo-space;
define pseudo-space segments based on the number of available processors and assigning said pseudo-space segments to certain processors of the available processors;
assign matrix elements of said first and second matrix to pseudo-space segments using a midpoint method thereby storing the matrix elements in respective caches corresponding to the certain processors associated with said pseudo-space segments;
assign a result matrix element of a result matrix to a pseudo-space segment using a midpoint method thereby assigning said result matrix element to a further processor associated with said pseudo-space segment;
transmit matrix elements of the first and second matrix required to establish a result matrix element to said further processor which processes said result matrix element; and
perform a multiplication procedure by said further processor based on the received matrix elements of the first and second matrix.

* * * * *